United States Patent [19]
Trelease

[11] 3,858,891
[45] Jan. 7, 1975

[54] RESILIENT SEAL

[75] Inventor: Robert B. Trelease, Los Angeles, Calif.

[73] Assignee: Hitco, Irvine, Calif.

[22] Filed: Jan. 2, 1973

[21] Appl. No.: 320,667

[52] U.S. Cl................................. 277/229, 138/44
[51] Int. Cl............................................ F16j 15/00
[58] Field of Search........ 277/229, 230, 234, 235 R, 277/236; 138/44

[56] References Cited
UNITED STATES PATENTS

| | | | |
|---|---|---|---|
| 1,203,762 | 11/1916 | Mastin | 277/230 |
| 1,493,615 | 5/1924 | Dieterich | 277/229 |
| 1,838,496 | 12/1931 | Ouen | 277/229 |
| 2,819,920 | 1/1958 | Synder et al. | 277/229 |
| 2,895,759 | 7/1959 | Conrad et al. | 277/229 |
| 3,361,432 | 1/1968 | Usher | 277/229 |
| 3,806,138 | 4/1974 | Herrington | 277/229 |

FOREIGN PATENTS OR APPLICATIONS

| | | | |
|---|---|---|---|
| 1,051,588 | 2/1959 | Germany | 277/236 |

Primary Examiner—Harry N. Haroian
Assistant Examiner—Robert I. Smith
Attorney, Agent, or Firm—Fraser and Bogucki

[57] ABSTRACT

A seal is provided having a capability of sealing with resilient, non-abrasive contact against a surface defining the boundaries of either an exit or access for fluid flow in a high temperature and pressure environment. The seal is generally toroidal in shape and comprises layers of resilient mesh material held upon a circular base by a series of flexible strips affixed over sections of the mesh material and fastened to the base. In one method of fabricating such a seal a sheath enveloping a mandrel and having a sleeve of mesh material disposed on the outside thereof is rolled back upon itself along the axis of the mandrel so as to frictionally engage the mesh sleeve and roll the mesh sleeve back upon itself, thereby forming a toroidal mesh configuration. An alternative method is provided whereby a loose spring is disposed about the exterior of the mesh sleeve to provide a tighter roll. A further alternative is provided in which a steel hoop is disposed about the mandrel over the mesh sleeve, to provide control of the mean diameter of the resulting seal.

13 Claims, 7 Drawing Figures

3,858,891
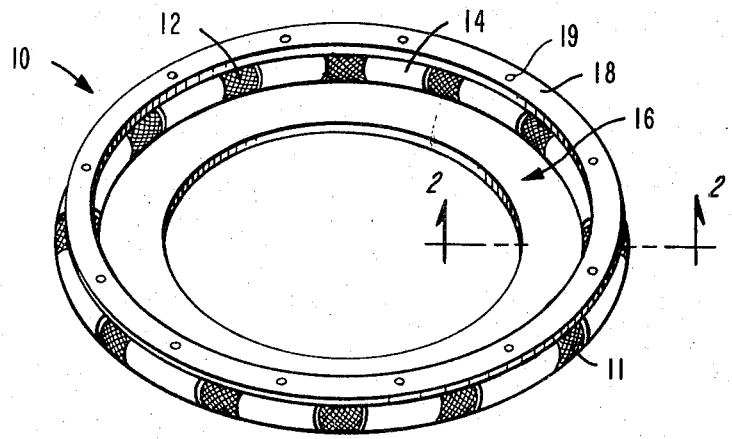
FIG.—1
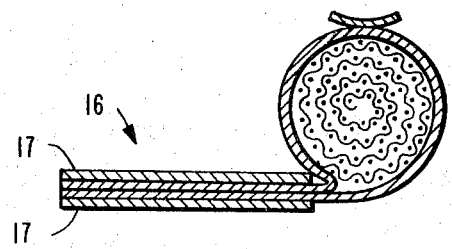
FIG.—2
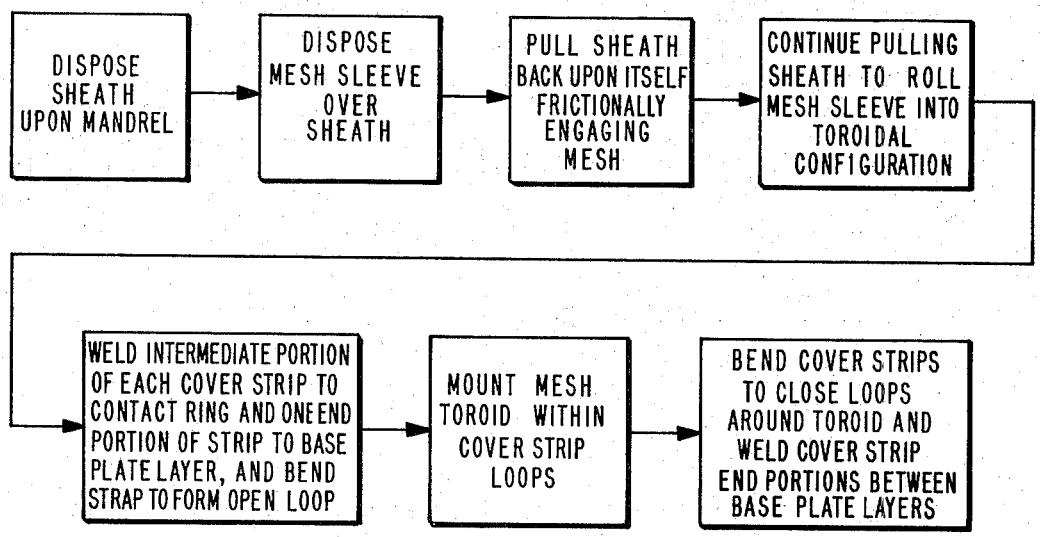
FIG.—3

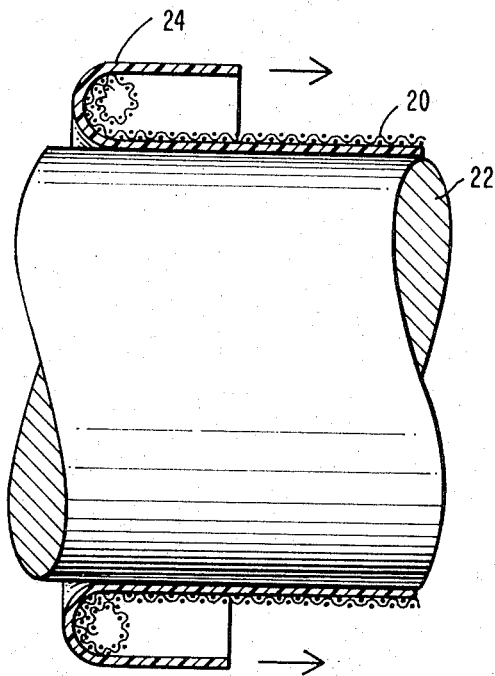
FIG.—4
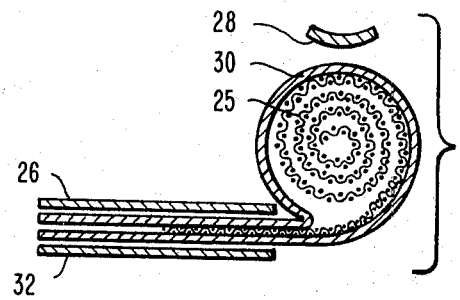
FIG.—5
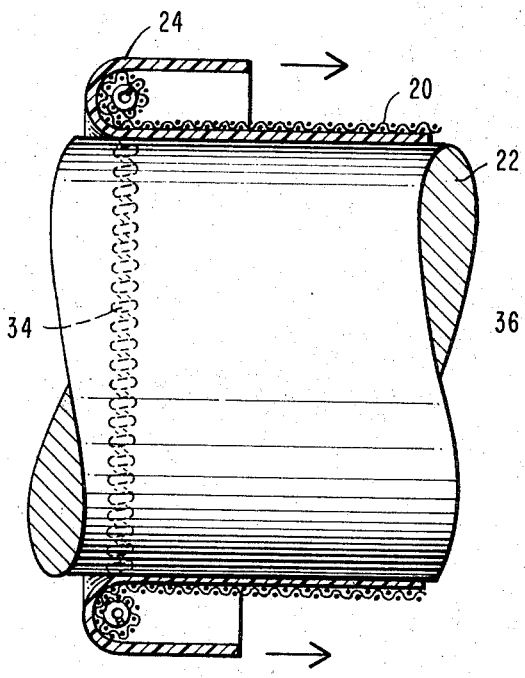
FIG.—6
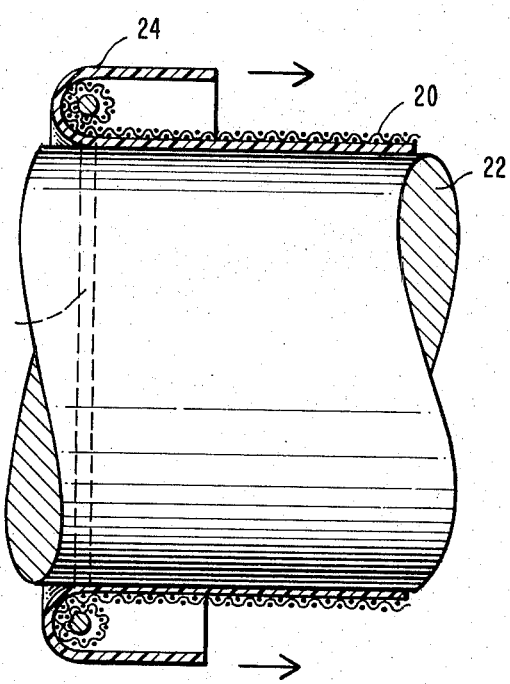
FIG.—7

RESILIENT SEAL

BACKGROUND OF THE INVENTION

1. Field of the Invention

The invention relates to systems and methods for providing soft, resilient seals with controllable leakage for use under conditions of high temperature and pressure.

2. Description of the Prior Art

There has been a continuing and increasing need for sealing devices operable at high temperatures and pressures and having the property of soft, resilient sealing for jet and turbine engines. A new requirement in the field of small, expendable jet engines, for example, has been to prevent "windmilling" in which the turbine continues to operate after cut off of power due to the angular momentum of the turbine rotor at high pressures. This shortens the useful life of the engine. A common expedient for suppressing windmilling is to seal the jet exhaust nozzle to brake the rotor by building up back pressure. This approach, however, and the seals used to implement it have proved relatively unsatisfactory, because of the nature of existing seals. Due to the relative softness of the metal at the interior of the jet exhaust and the high internal pressures of the exhaust, rigid, hard seals produce undesirable scoring and other damage resulting from the hard contact of the seal with the interior surface of the exhaust or tailpipe system. Such hard contact has appeared inevitable because the sealing material has been impelled against the sealing surface at the very high pressures which exist at the interior of the engine, and materials durable enough to withstand the pressures and temperatures tend to be relatively hard or to harden because of the temperatures.

Seals utilizing mesh structures have been employed in the jet engine context but have also proved unsatisfactory. Mesh-packed seals, though somewhat more resilient and thus less damaging to the interior of the jet exhaust, still tend to make a hard seal because of the internal pressurization which they undergo due to the high pressures present in the jet exhaust.

A further problem with high temperature, high pressure seals has been the character of the standard materials which have had to be used, given the constraints noted above. Neoprene and silicone, while exhibiting certain desirable properties, rapidly deteriorate at temperatures much above 300° – 500° F. The most commonly used material has been asbestos, which exhibits several favorable properites, including a greater resistance to high temperature than materials such as neoprene and silicone. Asbestos has drawbacks, however. It rapidly deteriorates with use, particularly at temperatures much above 900°– 1,000° F, which are frequently encountered within jet engines. As the asbestos deteriorates, it becomes pulverized, and emission of asbestos particles with the jet exhaust occurs. Recent studies have indicated that asbestos dust is highly carcinogenic, and there are strong indications that governmental agencies will in due course prohibit emission of asbestos dust into the atmosphere. The use of other materials, particularly metallic materials, for high pressure-high temperature soft seals has been contraindicated, particularly because of the difficulties of fabricating seals of the appropriate shape.

Therefore, there has been a recognized but unfilled need for non-deteriorative, resilient sealing devices useful under, and able to withstand high pressures and high temperatures.

SUMMARY OF THE INVENTION

A resilient seal for use under conditions of elevated temperatures and pressure in accordance with the invention comprises a resilient fluid-permeable inner element or core of mesh layers at least partially covered by a plurality of non-permeable cover strips in contact with the mesh layers. The ends of the cover strips are affixed to a circular base plate and form loops which encircle portions of the core. A circular contact ring is mounted on the cover strip elements on the opposite side of the core from the base plate to provide mating engagement with the inner surface of a jet engine tail pipe, where desired. The cover strips may be distributed to expose a selected proportion of the surface of the core between the edges of successive cover strips. This spacing provides the possibility of controlled leakage through the seal. In preventing jet engine windmilling, for example, a fairly substantial amount of such leakage ie permissible. Such leakage has the beneficial result that the seal and mesh material do not become rigidified and produce a hard seal; consequently, the device makes a soft, resilient seal with the sensitive portions of the interior of the jet exhaust system. In other applications, greater or less leakage may be obtained by simply decreasing the spacing between cover strips or by increasing the spacing, respectively. The elements are preferably of relatively soft, thin metallic foil.

Methods for fabricating high temperature, high pressure, resilient sealing devices are initiated by disposing a roll of mesh about a mandrel, over which a resilient elastic sheath is disposed. The sheath is pulled off the mandrel, concurrently frictionally engaging the mesh sleeve, which is rolled back along its length and in effect peeled off the mandrel. The mesh, when fully rolled, is withdrawn from the mandrel and wrapped in successive brackets of thin foil material which are affixed to a base plate. Where desired, a relatively loose spring may be disposed upon the roll of mesh and the mesh rolled upon it to insure a taut roll. A wire hoop may be disposed about the mesh roll and the mesh rolled upon the hoop to provide control of the mean diameter of the mesh roll. In conjunction with the use of the hoop, the mandrel may be tapered to compensate for the increasing width of the roll.

BRIEF DESCRIPTION OF THE DRAWINGS

FIG. 1 is a perspective view of a high temperature, high pressure, resilient seal in accordance with the invention;

FIG. 2 is a cross-sectional view of the seal of FIG. 1 along the line 2—2 of FIG. 1;

FIG. 3 is a block diagram of the successive steps involved in a preferred method of fabricating the seal of FIG. 1 in accordance with the invention;

FIG. 4 is a schematic illustration, somewhat simplified, of the manner in which particular steps of the method of FIG. 3 may be carried out in accordance with the invention;

FIG. 5 is a schematic illustration, somewhat simplified, of the manner in which other steps of the method of FIG. 3 may be carried out in accordance with the invention;

FIG. 6 is a schematic illustration of a step in an alternative method of fabricating sealing devices in accordance with the invention; and FIG. 7 is a schematic illustration of a step in yet another alternative method of fabricating sealing devices in accordance with the invention.

DETAILED DESCRIPTION OF THE INVENTION

As shown in FIGS. 1 and 2, a high temperature, high pressure, resilient seal 10 includes a resilient, fluid-permeable, endless circular core or inner element 11 comprising mesh layers 12. The mesh layers 12 may be spirally wound to form a toroid as shown and described herein or may comprise successive planar layers or other appropriate configurations providing resiliency, in accordance with the invention. A series of cover strips, cover elements, or outer elements 14 encircle the core 11 at intermediate portions between opposite ends of the strips 14 which are affixed to a circular base plate 16. The strips 14 which hold the core 11 are generally radially disposed about the periphery of the base plate 16 and are affixed thereto by appropriate means such as tack, seam or roll welding. As best seen in FIG. 2, the base plate 16 comprises two metal layers 17 sandwiching the end of the cover strips 14 and thus serves as a closure and an element of structural integrity for the seal 10. Alternatively, depending largely on manufacturing convenience, a trailing end of the core 11 may extend between the cover strip portions sandwiched between the layers 17. The intermediate portions of the strips 14 which encircle the core 11 are generally cylindrical in shape and conform to the outer surface of the core 11.

The cover elements are shown as disposed so that successive strips are spaced from each other, leaving exposed a portion of the surface of the core 11. As shown in FIG. 1 and FIG. 2, the configuration of the cover strips 14 provides a constant separation between edges of successive cover strips 14. Other configurations, however, may also be employed. The open configuration permits, as described in detail below, leakage through the seal 10. The amount of leakage, of course, is dependent upon the parameter of the spacing between successive cover strips 14, among other factors. Other embodiments of the invention having different spacing have different leakage characteristics; an embodiment having no spacing, i.e., having a configuration in which cover elements means entirely cover the core 11, has negligible leakage.

Thus, control of leakage from the seal 10 is permitted by the invention. In certain applications as, for example, in the exhaust of jet engines where it is critical in suppressing windmilling to provide substantial, but not necessarily complete, suppression of gas flow and at the same time provide a soft, resilient seal to avoid abrasion of the surfaces contacted by the open seal, the open spacing configuration is appropriate. The open configuration provided by the spacing between the cover strips 14 permits some gas flow but permits the seal to retain its resiliency since there is small internal pressurization. The requirements of different applications in which differing importance is put upon the resiliency and softness of the seal versus the suppressant action of the seal can be met by adjusting the configuration of the cover elements accordingly. Thus, seals in accordance with the invention provide unique versatility.

The base plate 16, with the attached cover elements 14, forms an envelope or holder for the mesh layers 12, and is preferably fabricated of deburred, thin metal. A contact ring 18 is affixed by conventional means such as spot welding to intermediate portions of the cover elements 14 on the opposite side of the core 11 from the base plate 16, and at a series of weld points 19. The contact ring 18 is mounted so that opposite edges curve outwardly and away from the core 11 to present a concave surface for mating engagement with the inner end of a jet engine tailpipe whenever a damper plate (not shown), upon which the seal 10 is mounted, moves the seal 10 into position at the tail pipe.

Other shapes than the toroid illustrated in FIG. 1, for seals in accordance with the invention, may be employed depending upon the specific configuration of the surface with which sealing contact is made. In certain applications, for example, an oval configuration is useful.

The seal 10 is preferably fabricated entirely of metallic materials. The cover elements 14 and the mesh layers 12 may be composed of stainless steel or a nickel-chrominum-iron alloy sold under the trademark "Inconel" by International Nickel Co. Thus, the substantial environmental problem produced by existing seals which deteriorate under use into particles (which, like asbestos, may have carcinogenic or other undesirable properties) expelled to the atmosphere, as in a jet stream, is avoided. Instead, a seal is provided which has proved capable of withstanding pressures on the order of 16 psi combined with temperatures on the order of 1,400° F without damage or significant deterioration. Consequently, the metallic construction of seals in accordance with the invention is a significant advantage.

As shown in FIGS. 3 and 4, methods are provided for fabricating seals in accordance with the invention. The fabrication methods are particularly advantageous because they permit, for the first time, efficient construction of high temperature, high pressure, resilient seals entirely of metal. A generally cylindrical mesh sleeve 20 is disposed about a mandrel 22 on the outside of a rolling sleeve or sheath 24. The rolling sheath 24 is tightly affixed to the mandrel 22 analogously to, for example, an elastic sock. An end of the sheath 24 extends sufficiently beyond the mesh sleeve 20 to be gripped. In operation, the method comprises gripping and extending end of the sheath 24 and pulling it back along its own length in effect, peeling it off the mandrel 22. The sheath 24 thus frictionally engages the mesh sleeve 20 causing the mesh to be pulled down together with the sleeve 24. As a natural consequence of this action the end of the mesh sleeve 20 is folded under, and the mesh is rolled into a spiral configuration.

When the sleeve-mesh combination reaches the inner end of the mandrel 22, the sheath 24 is pulled away leaving a fully formed toroidal, spirally wound core 25 (FIG. 5) of mesh layers corresponding to the core 11 of FIGS. 1 and 2. The free end of the core may either be welded to the core or may be treated as set out below.

In a preferred method of making the seal, a base plate layer 26 and a contact ring 28 corresponding, respectively, to one of the layers 17 and the ring 18 of FIGS. 1 and 2, are mounted in a jig which holds the parts 26, 28 in the same relative positions which they assume in the finished seal. One end of each of a series of cover strips 30 is then welded to the base plate layer 26, and the strips are bent into a series of partial loops. The free end of the core is then welded to the fastened strip 30. Intermediate portions of the cover strips are spot welded to contact ring 28. After being cut to form a discontinuous body, the core 25 is seated against the strips 30; the core ends are then rejoined. Following this step, the strips 30 are bent into closed loops conforming to the core 25, and the free ends of the loops are brought into contact with the already fastened ends. A second base plate layer 32 is disposed in contact with the free ends of the strips 30, and the combination of the strip end portions and the surrounding base plate layers 26, 32 is joined by welding or other conventional means.

Alternatively, the toroid 25 may be mounted adjoining base plate layers 26, 32 and cover strips 26 may be bend over the toroid 25 and fastened between the layers 26, 32 directly without the intermediate steps of severing the toroid and forming partial loops of the cover strips.

As a further alternative, the cover strips may be bent into a series of complete loops and fastened between the layers prior to insertion of the toroid into the series of loops.

An alternative method of fabricating mesh cores for use in resilient seals in accordance with the invention is depicted in FIG. 6. As shown in phantom in FIG. 6, a spring 34 is disposed fairly loosely upon the mesh sleeve 20 discussed above. When the sheath 24 is manipulated as previously described, the various layers of mesh roll back upon themselves and over the spring 30 in a garter-like action. The layers are then rolled back upon themselves as before. The presence of the spring 34 results in a tighter roll than would otherwise result. Thus in applications where compactness is at a premium, this method is appropriate.

As shown in FIG. 7, an alternative method of fabricating resilient seals in accordance with the invention comprises arranging the sheath 24 and the mesh sleeve 20 as discussed above and disposing a hoop 36 tightly over the mesh-mandrel combination. The mesh sleeve is then rolled over the hoop 32, which controls the dimensions of the roll by fixing the mean diameter thereof. In conjunction with this method, the mandrel 20 may be tapered to accommodate an increasing size of the roll as the rolling or folding over process reaches its final stages.

Particular embodiments of the invention have been described and depicted above. The invention is not, however, defined by the above description and is defined only by the following claims interpreted in light of the specification.

What is claimed is:

1. A resilient seal comprising:
a resilient, fluid-permeable inner element;
impermeable means covering portions of the inner element and including a plurality of individual cover elements disposed over the inner element at different locations along the length of the inner element.

2. The invention as set forth in claim 1 further means wherein each of the cover elements comprises an elongated strip which extends conformingly around the inner element and further including base plate means fastened to the ends of the elongated strips.

3. The invention as set forth in claim 2 wherein the inner element is comprised of metal mesh and the cover elements and the base plate are comprised of metal.

4. The invention as set forth in claim 1 wherein the cover elements are disposed in spaced-apart relation along the inner element so as to expose portions of the inner element.

5. The invention as set forth in claim 1 further including a contact element affixed to the cover elements on the opposite side of the inner element from the base plate.

6. A seal having controllable leakage and resiliency characteristics comprising:
gas-permeable resilient means; and,
gas-impermeable cover means fastened over the resilient means in sealing relationship thereto, and cover means defining open regions which expose the resilient means.

7. The invention as set forth in claim 6 wherein the resilient means comprises layers of metallic mesh and the cover means comprises a plurality of metallic strips encircling selected portions of the mesh.

8. A resilient, toroidal seal comprising:
a core of metallic mesh having a generally toroidal configuration;
a generally circular metal base plate; and,
a plurality of metal strips mounted on the base plate, each of the metal strips being wound in contact with the core and having its ends fastened to the base plate.

9. The invention as set forth in claim 8 wherein successive strips are spaced at selected intervals along the length of the inner core to permit controlled leakage through said metallic mesh.

10. The invention as set forth in claim 8 further including a generally circular contact ring mounted to the strips on the opposite side of the core from the base plate, the mounting ring being curved in cross-section to present a generally concave outer surface.

11. The invention as set forth in claim 8, wherein the core comprises a hollow, cylindrical sleeve of metallic mesh spirally rolled into an endless toroidal configuration.

12. The invention as set forth in claim 11 wherein the mesh sleeve has a free end and wherein the base plate comprises spaced-apart layers, said layers enclosing end portions of the metal strips and the free end of the mesh sleeve.

13. The invention as set forth in claim 8 wherein the base plate comprises spaced-apart layers and wherein the layers enclose end portions of the metal strips.

* * * * *